United States Patent [19]

Antonov et al.

[11] Patent Number: 5,574,108
[45] Date of Patent: Nov. 12, 1996

[54] EXTRUDABLE ADHESIVE COMPOSITIONS AND METHODS RELATING THERETO

[75] Inventors: Vladimir Antonov, Wilmington; David D. Zhang; Stephen R. Tanny, both of Newark; Alister M. Soutar, Wilmington, all of Del.

[73] Assignee: E. I. Du Pont de Nemours and Company, Wilmington, Del.

[21] Appl. No.: 424,756

[22] Filed: Apr. 18, 1995

Related U.S. Application Data

[63] Continuation-in-part of Ser. No. 221,150, Mar. 31, 1994, abandoned.

[51] Int. Cl.⁶ .................................... C08L 33/02
[52] U.S. Cl. ................ 525/221; 525/210; 428/35.7; 428/35.8; 428/365; 428/464; 220/359
[58] Field of Search ..................... 515/221, 220; 428/461, 35.7, 35.8, 365; 220/359

[56] References Cited

U.S. PATENT DOCUMENTS

| | | | |
|---|---|---|---|
| 3,709,957 | 1/1973 | Brebner | 325/221 |
| 4,085,861 | 4/1978 | Ruff | 220/90.4 |
| 4,376,845 | 3/1983 | Metzger | 525/196 |
| 4,678,836 | 7/1987 | McKinney | 525/221 |
| 4,725,637 | 2/1988 | Fernyhough | 524/271 |
| 5,066,543 | 11/1991 | Hwo | 428/412 |
| 5,092,952 | 3/1992 | Minnich et al. | 156/306.6 |
| 5,217,812 | 6/1993 | Lee | 428/461 |

FOREIGN PATENT DOCUMENTS

| | | | |
|---|---|---|---|
| 0140019 | 5/1985 | European Pat. Off. | C08L 23/08 |
| 0271254 | 6/1988 | European Pat. Off. | C09J 3/14 |
| 0472822 | 3/1992 | European Pat. Off. | C08J 5/12 |

*Primary Examiner*—Ralph H. Dean

[57] ABSTRACT

The present invention is directed to extrudable sealants which are particularly well suited for bonding a metal based, lidding material to a polystyrene container. The most preferred sealant compositions of the present invention preferably contain an acid copolymer, a tackifier and a polyolefin.

7 Claims, 1 Drawing Sheet

EXTRUDABLE ADHESIVE COMPOSITIONS AND METHODS RELATING THERETO

This application is a continuation-in-part of prior application Ser. No. 08/221,150, filed Mar. 31, 1994, and entitled "Extrudable Adhesive Compositions and Methods Relating Thereto", now abandoned.

FIELD OF THE INVENTION

The present invention is directed to extrudable sealants which are particularly well suited for bonding a metal based, lidding material (or the like) to a polystyrene, polypropylene or similar-type non polar container material, container coating material or the like. More specifically, the compositions of the present invention preferably comprise: a) a copolymer of ethylene and a carboxylic acid or acid derivative; b) tackifier; and c) optionally, a polyolefin and/or other additives.

BACKGROUND OF THE INVENTION

Broadly speaking, extrudable sealants are known. However, a long felt need exists in the art for an extrudable sealant which will efficiently and effectively seal a metallized lidding material to a foamed polystyrene type container. Conventional extrudable sealants have been problematic due to: a) poor adhesion to metal, such as aluminum; b) poor heat sealability to foamed polystyrene; and/or c) in some instances, poor high temperature resistance, particularly when approaching 100° C.

SUMMARY OF THE INVENTION

Overview

The extrudable sealants of the present invention preferably comprise:
a) a copolymer of ethylene and a carboxylic acid, particularly ethylene/acrylic acid, ethylene/methacrylic acid or combinations thereof, (alternatively in some embodiments, an acid derivative can be used in place of the acid, such as, an acid anhydride);
b) a substantially non polar tackifier, preferably having an acid number of less than 10, more preferably about 0; and
c) optionally, a polyolefin.

Conventional and non-conventional additives can also be added to the sealant compositions of the present invention. It has been surprisingly discovered that the compositions of the present invention are particularly well suited as extrudable sealants for sealing metallized lidding materials to polystyrene, polypropylene or other non polar polyolefin or similar type container material ("container material" is intended to include any portion of the supporting structure of the container or in the alternative can include a coating directly or indirectly supported by such supporting structure of the container) and have excellent adhesion to metal surfaces such as aluminum foil and the like. Each of the sealant components will be discussed first, and thereafter, preferred combinations and methods of use will be described.

Acid Copolymer

The sealants of the present invention preferably comprise at least about 20–90 weight percent ethylene/carboxylic acid copolymer, more preferably about 40%–85%, more preferably about 50%–80%, yet more preferably about 60%–75%. Preferred ethylene/acid copolymers are ethylene acrylic acid copolymer and ethylene methacrylic acid copolymer (these copolymers will hereafter be referred to collectively as "ethylene (meth)acrylic acid copolymer"). Also, all or part of the acid functionality can be substituted with an acid derivative, such as an acid anhydride, particularly where the acid derivative provides bonding to some extent when used in the final bonding application.

The ethylene (meth)acrylic acid copolymers may comprise additional radical polymerizable comonomers, including grafting comonomers. Potentially useful comonomers include, maleic anhydride, itaconic acid monomer, vinyl acetate, alpha-olefin (meth)acrylate, and the like.

Preferred ethylene (meth)acrylic acid copolymers have an acrylic and/or methacrylic acid content of preferably from about 3–40% by weight, more preferably 5–30% by weight and yet more preferably 5–20% by weight. The ethylene content is preferably in the range of about 60–95% by weight, and other comonomers are preferably in the range of about 0–25% by weight, more preferably 1–10% and most preferably 0–5%. Preferably, the ethylene (meth)acrylic acid copolymer has a melt index in the range of about 0.5–15, more preferably 1–14.

Tackifier

The preferred tackifiers of the present invention have a molecular weight in the range of about 200–3000, more preferably about 500–2000. The preferred tackifiers have softening points (ring and ball method) in the range of from about 50° to about 185° C., more preferably 70°–150° C.

The tackifier may preferably be one or more species selected from:
a) coumarone-indene resins,
b) phenolformaldehyde resins,
c) polyterpene resins,
d) xyleneformaldehyde resins,
e) polybutene,
f) rosin pentaerythritol ester,
g) rosin glycerin ester,
h) hydrogenated rosin,
i) hydrogenated rosin methyl ester,
j) hydrogenated rosin ethylene glycol ester,
k) hydrogenated rosin pentaerythritol ester,
l) polymerized rosin ester, such as, polymerized rosin polyhydric alcohol ester (e.g., polymerized rosin pentaerythritol ester),
m) aliphatic petroleum resin,
n) alicyclic petroleum resin,
o) synthetic polyterpene, pentadiene resin, etc.; and/or
p) mixtures or derivatives thereof.

Particularly preferred tackifiers include fully or partially saturated tackifiers, particularly aliphatic and alicyclic, most preferably hydrocarbon aliphatic and alicyclic tackifiers.

In the present invention, particularly preferred tackifiers comprise an aliphatic, alicyclic and/or aromatic hydrocarbon resin. In a preferred embodiment of the present invention, the tackifier comprises 5–40% by weight of the final sealant composition, more preferably, about 10–30% and yet more preferably about 15–25% by weight.

Other Optional Additives

Polyolefin

In a most preferred embodiment of the present invention, the sealant further comprises a polyolefin. Preferred polyolefins are polyethylene homopolymers, polyethylene/alpha-olefin copolymers and polyethylene copolymers, polypropylene copolymers, polybutene and poly4-methyl 1-pentene. If used, the applicable polyolefin comprises the following characteristics:
a) melt flow rate of preferably about 0.1–50 g/10 min, (ASTM D 1238 E), more preferably about 0.3–30 and yet more preferably about 1–14 g/10 min;

b) density of preferably about 0.820–0.970 g/cm$^3$, more preferably about 0.850–0.960, and yet more preferably about 0.91–0.96 g/cm$^3$;

c) an ethylene content of about 50–100 mol %, more preferably about 75–100 mol %; and d) has a melting point (ASTM D3418) in the range of about 60°–140° C., more preferably 90°–140° C.

The polyolefin can be a homopolymer or copolymer. Preferred copolymers are ethylene/alpha-olefin copolymers. Particularly useful alpha-olefin comonomers include 3–20 carbon atoms comonomers, such as, propylene, 1-butene, 1-hexene, 4-methy-1-pentene, 1-octene, 1-decene, 1-tetradecene, 1-octadecene, etc., and these alpha-olefins may be used either singularly or in admixtures of two or more. Particularly preferred comonomers are 1-butene, 1-hexene and 1-octene.

In the more preferred embodiments, the polyolefin component comprises two or more different polyolefins, preferably comprising a higher density polyolefin and optionally a lower density polyolefin. The preferred higher density polyolefin preferably has a melt index in the range of about 1–20, more preferably between 4–20 and has a density greater than about 0.92, more preferably in the range of about 0.93–0.97. The preferred lower density polyolefin has a density in the range of about 0.91 to about 0.93. The weight ratio of lower density polyolefin to higher density polyolefin is preferably about 0–75:100–25, more preferably about 15–50:85–50 and yet more preferably about 20–40:80–60. Alternatively, medium density polyethylene can be substituted for this mixture of high and low density polyolefin; the medium density polyethylene preferably has a density in the range of about 0.925–0.945.

Alternatively or in addition, an ethylene copolymer can also be incorporated into the compositions of the present invention, such as, polyethylene acrylate, polyethylene methacrylate, ethylene vinyl acetate and/or derivatives thereof. For example, if ethylene vinyl acetate copolymer is used, the acetate portion of the polymer should be up to about 25% by weight, more preferably about 3–20% by weight acetate relative to the weight of the entire copolymer.

All or a portion of any of the polyolefins of the present invention can be graft-modified with unsaturated carboxylic acid or its derivative. If so, the polyolefin is preferably grafted with about 0.01–15% by weight grafting monomer, more preferably 0.05–15% by weight. The melt flow index is preferably 0.1–50 g/10 min, more preferably 0.3–30 g/10 min. Suitable grafting monomers include:

a) carboxylic acids such as acrylic acid, maleic acid, fumaric acid, tetrahydrophthalic acid, itaconic acid, citraconic acid, crotonic acid, isocrotonic acid, Nadic acid (endocis-bicyclo [2,2,1]hepto-5-en-2,3-dicarboxylic acid), etc., or b) derivatives thereof, for example, acid halides, amides, imides, anhydrides, esters, etc., such as, maleic anhydride, citraconic anhydride, monomethyl maleate, monoethyl maleate, Nadic anhydride, etc.

Particularly useful grafting monomers are maleic acid or acid anhydrides thereof.

Graft modification of polyethylene is well known, and can be accomplished by adding graft monomer by any conventional means known in the art.

Other Additives

Other conventional and non-conventional additives can be incorporated into the sealant compositions of the present invention, such as, slip additives, antiblock, chill roll release, pigments, antifog, antistat, and the like, so long as the additives do not unduly interfere with bonding performance. The total amount of such other optional additives can be up to about 25% by weight of the final composition, more preferably up to about 15% and yet more preferably up to 10%. Additives can be added directly or through the use of a masterbatch concentrate. It has been found, however, that the addition of wax is detrimental to the compositions of the present invention. The final sealant composition must however be substantially free of halogen, cation, epoxy or silane moieties.

The Final Composition

The melt flow rate of the final composition is preferably about 0.1–50 g/10 min, more preferably 0.3–30 g/10 min, more preferably 0.5–25 g/10 min and yet more preferably 0.5–20 g/10 min.

The sealant resin compositions of the present invention may be prepared by combining the above-mentioned components by various known methods, for example, by mixing these components together with a Henschel mixer, v-blender, ribbon blender, tumbler blender, etc., or melt kneading the resulting mixture with a single screw extruder, twin screw extruder, kneader, Banbury mixer, etc., followed by pelletizing or melt extrusion.

Upon proper melt blending or heat mixing, the composition can be extruded through a die and onto a substrate, such as the metal surface of an aluminum foil or other metallized lidding or packaging material or the like. The thickness of the extruded sealant is preferably about 1–100 microns, more preferably 5–60 microns.

Alternatively, the compositions of the present invention can be extruded into a film having a thickness of about 1–100 microns, more preferably 5–60 microns and laminated to a metal as part of a multilayer structure. In use, the multilayer structure is pressed against a substrate surface material and heated, thereby bonding the multilayer structure to the substrate; preferred substrate surface materials include polystyrene, polypropylene or other substantially non polar polyolefin.

The sealant compositions of the present invention has been found to have excellent adhesion to aluminum foil, excellent sealability to foamed polystyrene and in some embodiments excellent temperature resistance to temperatures up to 100° C. The final compositions can be used as a direct extrusion coatable resin for application directly onto aluminum foil or metallized film, such as metallized poly (ethylene terephthalate) (generally, there is no need for adhesives, or primers for bonding to the metal), and the composition can act as a heat seal layer that will heat seal a first substrate surface material, such as, aluminum to a second substrate surface material, such as, styrene foam, polypropylene or the like.

DETAILED DESCRIPTION OF THE PREFERRED EMBODIMENT(S)

The present invention is further illustrated by the following examples.

EXAMPLES

EXAMPLE 1

Resin blends (R-1 to R-6) were compounded in a 2.5" single screw extruder. The blends were subsequently coated on 2 mil aluminum foil using a 2" extrusion coating machine with a 24" flat die and a die opening of 10 miles. The coating thickness was approximately 1.5 mils. Extrusion coating melt temperature, coating line speed and air gap were about 459° F. 62 ft/min and 6 inches respectively. Detailed blend compositions are listed in Table 1. The adhesion of the coating to foil was measured using ASTM A630.0030 and results are shown in Table 2. Heat seal test and peel adhesion failing temperature (PAFT) were measured to determine the heat seal strength to PS foam and rank the heat resistance of the heat seal layer. Both test procedures are described below and test results are given in Table 2.

EXAMPLE 2

Resin blends LC1 to LC5 were prepared in a 2.5" single screw extruder. Detailed blend compositions are shown in Table 3. A paper/ethylene methacrylic acid copolymer*(9% MAA and 10 MI)/aluminum foil laminate was prepared by using extrusion lamination on a 4.5" extrusion coating machine with a 42" flat die and a 25 mil die opening. The blends (LC1 to LC5) were coated on to the foil side of the laminate using the same extrusion coating machine with a die opening of 25 mils. The coating thickness was approximately 1 mil. The coating line speed and air gap were set at 300 ft/min and 6.5 inches respectively. The adhesion of the coating to foil, coating heat seal strength and peel adhesion failure temperature to PS foam were measured and results are listed in Table 4.

Test Methods

Method Used to Measure Heal Seal Strength

Coated samples were cut into one inch strips and heat sealed to a substrate using a one inch width heat seal bar. Heat seal test was carried out under three different temperature settings (250°, 300°, 350° F.). The heat seal bar was in contact with the paper at 40 psi pressure and 1 second dwell time. The heat sealed samples were then conditioned for 24 hours at 73° F. 50% RH before being pulled by an Instron at cross head speed of 12 inch/minute. The maximum force to separate the seal strip was recorded as the heat seal strength. The reported heat seal strength is the average of samples.

BRIEF DESCRIPTION OF THE DRAWINGS

Method Used to Check Peel Adhesion Failure Temperature (PAFT)

Heat sealed samples were prepared according to the procedure described for heat seal strength measurement. After the samples were prepared, the sealed samples were put in a variable temperature oven. The substrate side of the heat sealed sample was securely mounted in the oven. A bull dog clip was attached to the coated sample strip and allowed to hang unsupported. As shown generally at 10 in FIG. 1, a 100 g weight 12 was hooked into a bull dog clip 14 which places a downward force on coated sample 16 which is heat sealed to substrate 17 mounted to mounting plate 18 by means of tape 20.

Figure 1:
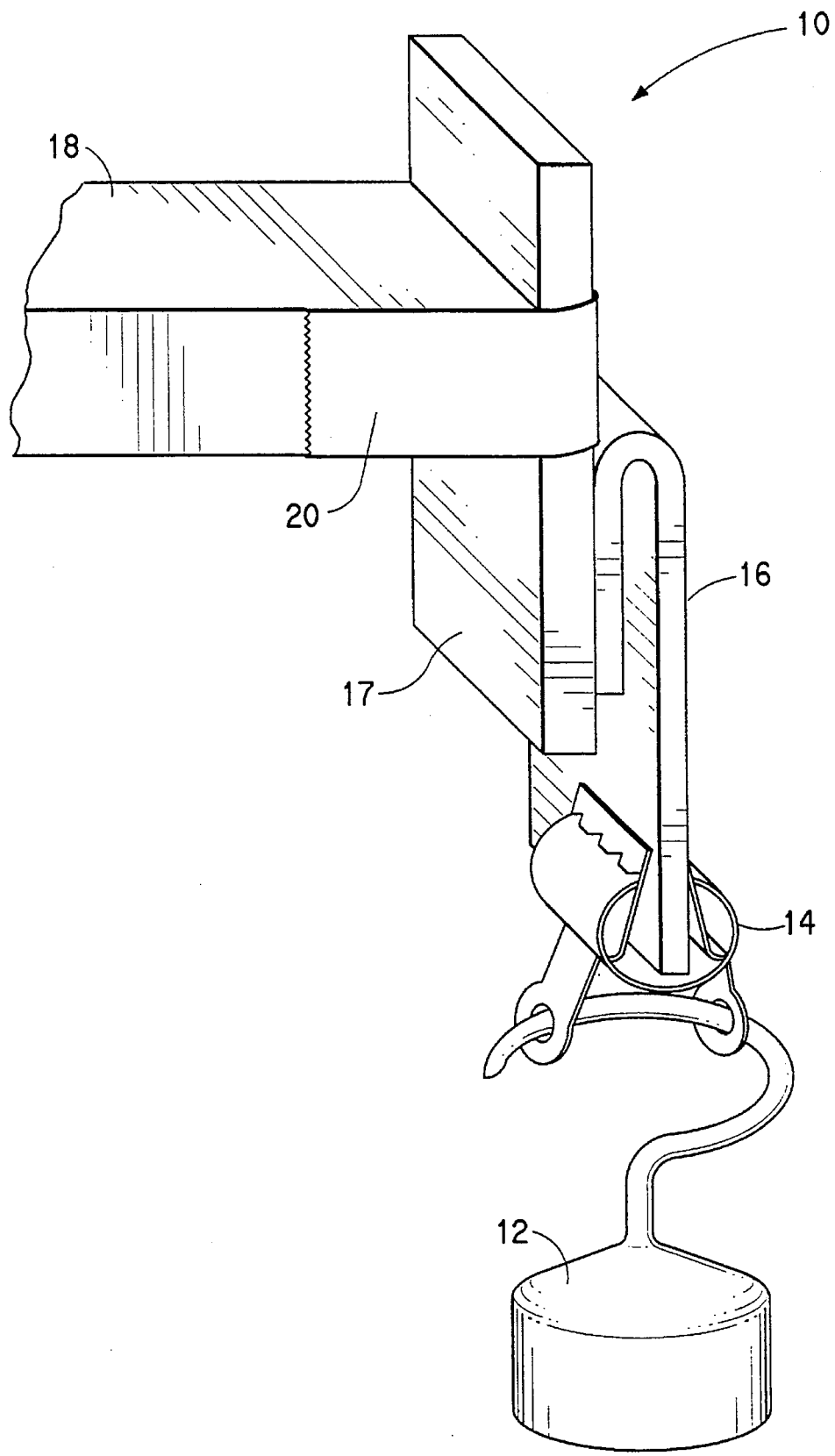

The oven temperature was raised from room temperature at the rate of 1° F./min until the coated sample separated from the substrate. The temperature at which the seal failed was recorded automatically by a sensor and designated as the peel adhesion failure temperature (PAFT).

TABLE 1

| Resin blend | Melt Index (ASTM D1238) | Density (ASTM D792) | % Olefin Polymer #1 (1) | % Olefin Polymer #2 (2) | % Olefin Polymer #3 (3) | % Tackifier (4) | % Acid Copolymer #1 (5) | % Acid Copolymer #2 (6) | % Acid Co polymer #3 (7) | % Acid Terpolymer (8) | % Ethylene Methyl Acrylate Copolymer #1 (9) | % Ethylene Methyl Acrylate Copolymer #2 (10) | % Acid Copolymer based Slip Concentrate (11) | % Acid Copolymer based Anti-Block Concentrate (12) |
|---|---|---|---|---|---|---|---|---|---|---|---|---|---|---|
| R-1 | 9.4 | — | 9.75 | 2.63 | 2.62 | 0 | 0 | 30 | 0 | 0 | 50 | 0 | 2 | 3 |
| R-2 | 12 | 0.942 | 8.45 | 2.28 | 2.27 | 13 | 35 | 20 | 0 | 0 | 0 | 13 | 2.5 | 3.5 |
| R-3 | 9 | 0.946 | 16.25 | 4.38 | 4.37 | 10 | 35 | 27.5 | 0 | 0 | 0 | 0 | 1 | 1.5 |
| R-4 | 10.5 | 0.944 | 0 | | | 13 | 35 | 0 | 20 | 0 | 0 | 26 | 2.5 | 3.5 |
| R-5 | 11.7 | 0.955 | 0 | | | 13 | 35 | 0 | 46 | 0 | 0 | 0 | 2.6 | 3.4 |
| R-6 | 10 | 0.942 | 0 | | | 0 | 0 | 0 | 0 | 28 | 65 | 0 | 4 | 3 |

(1) High density polyethylene: density of 0.97 g/cc and MI of 18 g/10 min
(2) Low density polyethylene: density of 0.917 g/cc and MI of 4 g/10 min
(3) Low density polyethylene: density of 0.926 g/cc and MI of 8 g/10 min
(4) Saturated alicyclic hydrocarbon resin with a molecular weight of 750, and Ring and Ball softening point of 125° C.
(5) Ethylene methacrylic acid copolymer (12% MAA, 1.5 MI and 0.94 density)
(6) Ethylene methacrylic acid copolymer (12% MAA, 7 MI and 0.94 density)
(7) Ethylene methacrylic acid copolymer (9% MAA, 10 MI and 0.93 density)
(8) Ethylene methacrylic acid and isobutyl acrylate terpolymer (10% MAA, 10% iBA, 10 MI)
(9) Ethylene methyl acrylate copolymer (20% MA, 6 MI and 0.942 density)
(10) Ethylene methyl acrylate copolymer (6.5% MA, 6 MI and 0.922 density)
(11) 80% of ethylene methacrylic acid copolymer with 9% methacrylic acid and 10 MI plus 20% stearamide
(12) 87.5% of ethylene methacrylic acid copolymer with 9% methacrylic acid and 10 MI plus 12.5% of silica

TABLE 2

| Resin blend/foil (1.5 mil/2 mil) | Adhesion to Aluminum (g/inch) ASTM A630.0030 | Heat Seal to PS Foam (g/inch) @ 250-300-350 (F) | PAFT (C) |
|---|---|---|---|
| R-1/foil | 11 | 379-557-789 | 64 |
| R-2/foil | 439 | 519-501-729 | 108 |
| R-3/foil | 265 | 305-556-620 | 109 |
| R-4/foil | 415 | 389-602-785 | 109 |
| R-5/foil | 427 | 449-673-835 | 106 |
| R-6/foil | 7 | 542-642-879 | 42 |

TABLE 3

| Resin Blend | Melt Index ASTM D1238 | Density ASTM D792 | % Olefin Polymer #1 (1) | % Olefin Polymer #2 (2) | % Olefin Polymer #3 (3) | % Olefin Polymer #4 (4) | % Tackifier (5) | % Acid Copolymer #1 (6) | % Acid Copolymer #2 (7) | % Ethylene Acrylate Copolymer (8) | % Acid Copolymer Based Slip Concentrate (9) | % Acid Copolymer Based Antiblock Concentrate (10) |
|---|---|---|---|---|---|---|---|---|---|---|---|---|
| LC1 | 11.2 | 0.946 | 16.25 | 4.38 | 4.37 | 0 | 17 | 40 | 13 | 0 | 2.5 | 2.5 |
| LC2 | 11.9 | 0.944 | 13 | 3.5 | 3.5 | 0 | 17 | 40 | 18 | 0 | 2.5 | 2.5 |
| LC3 | 11.0 | 0.948 | 9.75 | 2.63 | 2.62 | 0 | 17 | 40 | 23 | 0 | 2.5 | 2.5 |
| LC4 | 11.9 | 0.942 | 0 | 0 | 0 | 20 | 17 | 40 | 18 | 0 | 2.5 | 2.5 |
| LC5 | 12.2 | 0.943 | 11.7 | 3.15 | 3.15 | 0 | 17 | 40 | 0 | 20 | 2.5 | 2.5 |

(1) High density polyethylene: density of 0.97 g/cc and MI of 18 g/10 min
(2) Low density polyethylene: density of 0.917 g/cc and MI of 4 g/10 min
(3) Low density polyethylene: density of 0.926 g/cc and MI of 8 g/10 min
(4) Medium density polyethylene: density of 0.93 g/cc and MI of 6.8 g/10 min
(5) Saturated alicyclic hydrocarbon resin with a molecular weight of 750, and Ring and Ball softening point of 125° C.
(6) Ethylene methacrylic acid copolymer (12% MAA, 1.5 MI and 0.94 density)
(7) Ethylene methacrylic acid copolymer (12% MAA, 7 MI and 0.94 density)
(8) Ethylene methyl acrylate copolymer (6.5% MA, 6 MI and 0.922 density)
(9) 80% of ethylene methacrylic acid copolymer with 9% methacrylic acid and 10 MI plus 20% stearamide
(10) 87.5% of ethylene methacrylic acid copolymer with 9% methacrylic acid and 10 MI plus 12.5% of silica

TABLE 4

| Resin Blend/foil (1.3 mil/2 mil) | Foil adhesion (g/inch) ASTM-A630.0030 | Heat Seal to PS foam (g/inch) @ 250-300-350 (F) | PAFT (C) |
|---|---|---|---|
| LC1/foil-paper laminate | 263 | 82-164-204 | — |
| LC2/foil-paper laminate | 1071 | 88-149-189 | 108 |
| LC3/foil-paper laminate | 871 | 136-230-314 | 107 |
| LC4/foil-paper laminate | 385 | 119-305-436 | — |
| LC5/foil-paper laminate | 124 | 125-320-390 | — |

What is claimed is:

1. A thermoplastic sealant composition for adhering polystyrene to metal, the improvement comprising:
   a) a random polymerized, unneutralized, acid copolymer having an acid content of from about 5 to about 20 percent by weight; and
   b) a substantially saturated, non polar hydrocarbon tackifier having an acid number of about 0;
   wherein:
   i. the weight ratio of a:b is in the range of about 20–90:80–10;
   ii. the final sealant composition is substantially free of halogen, cation, epoxy or silane moieties; and
   iii. the final sealant composition defines a melt index in the range of about 0.3–30 g/10 min (ASTM D 1238 E).

2. A composition in accordance with claim 1 wherein a) is an ethylene acrylic acid copolymer or an ethylene methacrylic acid copolymer.

3. A composition in accordance with claim 2 further comprising 3%–40% by weight (based upon the weight of the final composition) polyolefin having the following characteristics:
   a) melt flow rate of about 0.3–30 g/10 min (ASTM D 1238 E);
   b) a density of about 0.820–0.960 g/cm$^3$;
   c) an ethylene content of about 50–100 mol %; and
   d) a melting point (ASTM D3418) in the range of about 60° C.–140° C.

4. A composition in accordance with claim 3 wherein the polyolefin component further comprises:
   A. a polyolefin having a melt index in the range of about 1–20, and a density in the range of about 0.93 g/cm$^3$–0.97 g/cm$^3$, and
   B. a polyolefin having a density of from about 0.91 g/cm$^3$ to about 0.93 g/cm$^3$ wherein the ratio of A:B is in the range of about 40–90:60–10.

5. A composition in accordance with claim 3 wherein the polyolefin component is a medium density polyolefin having a density in the range of about 0.925 to about 0.945.

6. A composition in accordance with claim 5 wherein the tackifier has a molecular weight in the range of about 500–2000, a softening point (ring and ball method) in the range of from about 70° C. to about 150° C.

7. A package comprising:
   a foamed polystyrene container;
   a lidding film comprising a metallized layer; and
   a thermoplastic sealant adhered to the lidding structure which bonds or seals the lidding film to the container, the sealant comprising:
   a) a random polymerized, unneutralized, acid copolymer having an acid content of from about 5 to about 20 percent by weight; and
   b) a substantially non polar tackifier having an acid number of about 0;
   wherein:
   i. the weight ratio of a:b is in the range of about 40–90:10–60;
   ii. the final sealant composition is substantially free of halogen, cation, epoxy or silane moieties; and
   iii. the final sealant composition defines a melt index in the range of about 0.3–30 g/10 min (ASTM D 1238 E).

* * * * *